United States Patent [19]

Waller et al.

[11] 4,394,119

[45] Jul. 19, 1983

[54] PROCESS FOR COMBUSTING AMMONIA-CONTAINING GASES WHICH ALSO CONTAIN HYDROGEN SULFIDE

[75] Inventors: Jan Waller; Philippus Loof, both of The Hague, Netherlands

[73] Assignee: Shell Oil Company, Houston, Tex.

[21] Appl. No.: 231,839

[22] Filed: Feb. 5, 1981

[30] Foreign Application Priority Data

Feb. 26, 1980 [NL] Netherlands .......................... 8001137

[51] Int. Cl.³ .............................................. F23D 13/20
[52] U.S. Cl. ........................................ 431/5; 431/284; 423/573 G; 423/574 R
[58] Field of Search ........................... 431/5, 202, 284; 422/160; 423/573 G, 574 R

[56] References Cited

U.S. PATENT DOCUMENTS

| | | | |
|---|---|---|---|
| 2,840,152 | 6/1958 | Reed | 431/284 X |
| 3,661,534 | 5/1972 | Reed | 422/160 |
| 3,936,275 | 2/1976 | Perret et al. | 422/160 |
| 4,035,158 | 7/1977 | Scott et al. | 431/284 X |
| 4,094,625 | 6/1978 | Wang et al. | 431/284 X |

Primary Examiner—Edward G. Favors

[57] ABSTRACT

An ammonia-containing gas stream and a hydrogen sulfide-containing gas stream are combusted to a mixture of $SO_2$ and $H_2S$ in a ratio of substantially 1:2 in the thermal zone of a sulfur recovery unit by feeding said streams separately to a burner comprising a double-barrelled gun of two concentric tubes, the ammonia-containing gas stream being fed to the inner tube of the gun and the hydrogen sulfide-containing gas stream being fed to the outer tube.

8 Claims, 3 Drawing Figures

PROCESS FOR COMBUSTING AMMONIA-CONTAINING GASES WHICH ALSO CONTAIN HYDROGEN SULFIDE

BACKGROUND OF THE INVENTION

1. Field of the Invention

The invention relates to a process for combusting ammonia-containing gases which also contain hydrogen sulfide, in the thermal zone of a sulfur recovery unit.

2. Description of the Prior Art

The recovery of elemental sulfur from hydrogen sulfide-containing gases by means of the Claus reaction is known and different operation modes for carrying out this reaction are being applied in practice.

In one of these cases the Claus reaction is carried out by partially combusting the hydrogen sulfide-containing gases with air in a thermal zone to form a gas mixture containing sulfur dioxide ($SO_2$) and hydrogen sulfide ($H_2S$) in a preferred ratio of 1:2, whereupon the gases are cooled after leaving the thermal zone in order to condense the sulfur vapor formed and recover the sulfur as liquid sulfur. Subsequently, the gases are conducted to one or more catalytic reaction zones where an extra quantity of sulfur is formed. Before introduction into a catalytic zone the gases are first brought to the desired reaction temperature and after leaving this zone they are re-cooled by recovery of the sulfur formed.

The hydrogen sulfide-containing gases mostly originate from desulfurization processes in a refinery or from natural gas from which the acid gas components are removed in gas purification units by means of absorption in certain absorbents. After regeneration of the usually aqueous absorbent used, a gas is obtained which contains the hydrogen sulfide in enriched concentration.

A great many if not most crude oils processed in a refinery contain nitrogen compounds in addition to sulfur compounds. In the large number of catalytic processes which are used for processing crude oils and employ hydrogen, ammonia ($NH_3$) is obtained in addition to hydrogen sulfide. Hydrogen sulfide and ammonia are also formed in many processes which are not primarily intended to remove sulfur and nitrogen, such as thermal and catalytic cracking. Consequently, liquid or gaseous product streams containing said compounds are formed, which compounds must be removed from said streams. The removal of ammonia (and partly of hydrogen sulfide) from such streams, generally originating from hydrocarbon conversion processes, can be effected by washing with water at, for example, elevated pressures and reduced temperatures. Washing is mostly carried out with an abundant quantity of water, so that dilute solutions are formed which contain ammonia and, in addition, hydrogen sulfide. In view of the increasing legislation on environmental pollution abatement such water streams can no longer be discharged as such into open surface water streams.

As a result of the various other treatments in a refinery, in addition to the above-mentioned water stream, other waste water streams are formed which, combined with the above water stream, can be jointly referred to as "sour water". In order to render said polluted water stream suitable for discharge into open surface water steam-stripping is currently applied. This results in an acid stripper gas containing ammonia and hydrogen sulfide in addition to water vapor. The acid gas can then be conducted to a combustion furnace and after combustion be discharged to the environment through a stack. However, if the acid gas contains much hydrogen sulfide, the water pollution problem has been changed into an air pollution problem. A sulfur recovery unit being present, it might be possible to consider supplying this acid gas to said units in order to combust both the ammonia present and the hydrogen sulfide. Although various proposals have already been made to this end, the supply of ammonia-containing gas streams to a sulfur recovery unit presents difficulties in the operation of such units for a complex of reasons. If the mixing of the ammonia-containing gas with the hydrogen sulfide-containing gas and air is not accomplished to perfection, firstly the conversion of ammonia cannot be complete and secondly, as a result of local excess of oxygen, nitrogen oxides ($NO_x$) can be formed from ammonia, which nitrogen oxides, it is assumed, catalytically promote the formation of sulfur trioxide ($SO_3$) from sulfur dioxide. Said sulfur trioxide formed may subsequently cause serious dewpoint corrosion in colder parts of the unit or cause the formation of solid deposits of ammonium salts in those parts of the unit where the temperature has fallen sufficiently, such as in the sulfur condensers, pipelines and the like. This results in clogging of pipes, etc.

The present invention aims at providing a process enabling the ammonia-containing gases which also contain hydrogen sulfide to be combusted in a sulfur recovery unit without the occurrence of said drawbacks. Other objectives will appear from the following.

SUMMARY OF THE INVENTION

The invention relates to a process for combusting ammonia-containing gases which also contain hydrogen sulfide, in a thermal zone of a sulfur recovery unit in which hydrogen sulfide-containing gases are partially combusted to a mixture of sulfur dioxide and hydrogen sulfide in a ratio of substantially 1:2 by supplying said hydrogen sulfide-containing gases to a burner consisting of a double gun having two concentric tubes and surrounded by an air register, which burner debouches into a mixing zone followed by a combustion zone, in which process said hydrogen sulfide-containing gases enter the mixing zone via the outer of the two concentric tubes and are mixed in said mixing zone with an oxygen-rich gas or gas mixture which is supplied to the mixing zone via the air register. The process is characterized in that the ammonia-containing gases are separately supplied to the thermal zone via the inner of the two concentric burner gun tubes, with said ammonia-containing gases leaving the burner and entering the mixing zone at about the plane of emergence of said hydrogen sulfide-containing gases.

Since the acid stripper gas contains much water vapor as well as hydrogen sulfide and ammonia in approximately equal quantities, it is necessary to prevent condensation of water vapor and the formation of ammonium sulfide as a result of cooling. Therefore, the ammonia-containing gases must have a temperature of at least 85° C. The acid stripper gas usually becomes available at this temperature from the water stripper, but condensation during transport and supply to the burner and in the burner must be prevented. The inner of the two concentric tubes preferably has a central supply tube for steam through which steam is supplied during operation in order to maintain the ammonia-containing gases at the desired (minimum) temperature.

The temperature of these gases is preferably maintained at 90°–110° C., depending on the steam temperature used. For this purpose low-pressure steam (100–400 kPa) is usually applied. This steam is finally supplied to the mixing zone to be mixed with the gas mixture formed there and containing hydrogen sulfide, ammonia and oxygen.

The process according to the invention is particularly suitable for application to those ammonia-containing gases which contain ammonia in such a quantity that the total acid gas mixture has an ammonia content of at least 3% by volume. The process is particularly suitable for processing gases which contain ammonia in such a quantity that the ammonia content of the total acid gas mixture is about 3–15% by volume. In connection with the foregoing, by the "total acid gas mixture" is meant the hydrogen sulfide-containing gas mixture obtained when the ammonia- and hydrogen sulfide-containing gases are mixed with the hydrogen sulfide-containing gases. As appears from the foregoing, the ammonia content of the separate ammonia-containing gases is not so important, but rather the final ammonia content of the total acid gas mixture.

However, the above-mentioned limits are also determined by the hydrogen sulfide content. If the gases to be processed, when mixed, attain an ammonia content relative to hydrogen sulfide greater than 0.04 mol. of $NH_3$/mol. of $H_2S$, difficulties may be expected in the operation of a conventional sulfur recovery unit. In those cases the process according to the invention can very suitably be used since as a result of the gases being separately supplied through the burner and being mixed in a separate mixing zone in the presence of the calculated quantity of oxygen, complete combustion of the ammonia to nitrogen and partial combustion of the hydrogen sulfide are indeed obtained. This is the result of the fact that before the total acid gas mixture reaches the combustion zone, complete or substantially complete mixing of the oxygen-rich gas or gas mixture (air) with the acid gases to be combusted has taken place.

Even better mixing can be ensured by providing the passage between the mixing zone and the combustion zone with a constriction. Consequently, when the gas mixture enters the combustion zone, convection currents develop in said combustion zone, as a result of which a desirable back-mixing of combustion gases with the supplied oxygen-rich gas mixture takes place.

It has been found empirically that very good results are obtained by the process according to the invention with a burner in which the ratio of the distance between the plane of emergence of the hydrogen sulfide-containing gases and the constriction between mixing zone and combustion zone to the diameter of said constriction lies between 0.62 and 0.80, and the ratio between the burner diameter, measured at the outer of the two concentric burner gun tubes, to the diameter of the constriction lies between 0.68 and 0.77.

It appears from the above data that in the process according to the invention the burner nozzle must not project into the combustion zone since the desirable intimate mixing of all the gases supplied to the burner will then not be obtained.

Further, the process according to the invention has the advantage that no separate oxygen or air streams need be supplied to the burner since all the oxygen needed for complete combustion of ammonia and of the required quantity of hydrogen sulfide can be supplied as a single air or oxygen stream via the air register. This implies a simplification of the line-up of the various supply lines.

In order to ensure that the ammonia is completely combusted and further that the Clause reaction will proceed satisfactorily, it is desirable that a reaction chamber is present following the combustion zone and is so chosen in relation to the gas feed rate that the residence time of the total gas mixture in the reaction chamber is at least 0.4 seconds and preferably 0.5–1.2 seconds.

Any hydrocarbons present in the hydrogen sulfide-containing gases, such as lower alkanes (propane, butane, etc.) or aromatics (benzene or benzene derivatives) are completely co-combusted and do not give rise to the formation of "black" sulfur. However, when proportioning air, allowance should be made for the presence of such hydrocarbons, as will be obvious to one skilled in the art.

After leaving the thermal zone, the combustion gases, which are now substantially free from ammonia (less than 25 ppmv), are further treated in the usual manner, namely: they are cooled in order to condense the sulfur and separate it as liquid sulfur and after removal of the sulfur, they are reheated and supplied to one or more catalytic zones in order to react the remaining sulfur dioxide again with the remaining hydrogen sulfide, with formation of an additional quantity of sulfur, in the presence of a suitable catalyst.

BRIEF DESCRIPTION OF THE DRAWING

FIG. 1 shows a partial longitudinal cross section of the thermal zone of a sulfur recovery unit with burner. In this cross section the burner is not cut through.

DETAILED DESCRIPTION OF THE DRAWING

Figure 1:
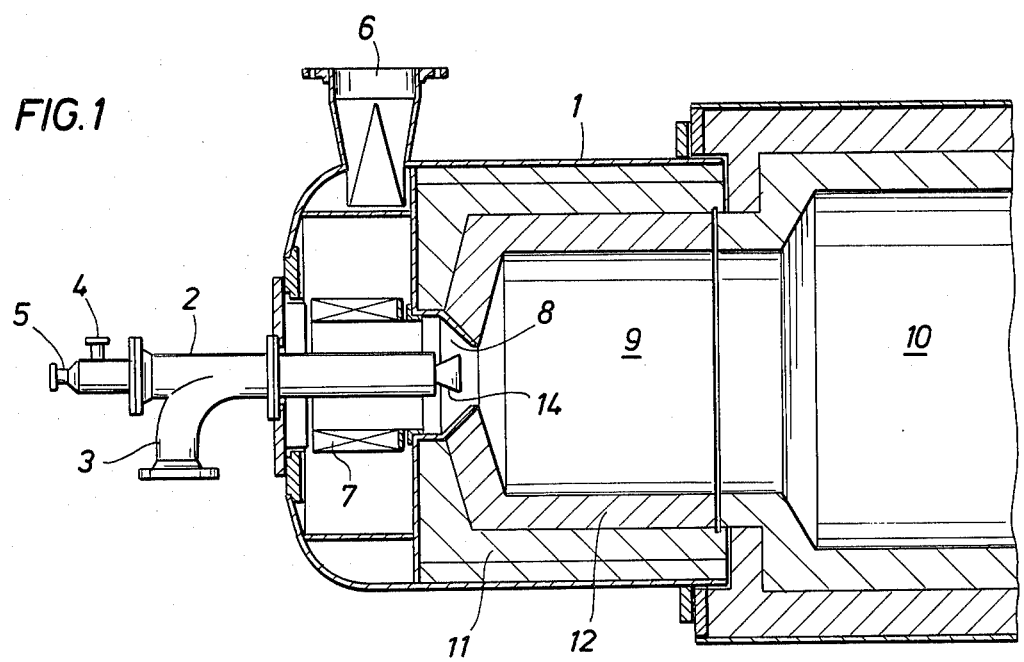

In FIG. 1, reference numeral 1 represents the thermal zone consisting of a burner 2, a combustion chamber 9 and a reaction chamber 10. The burner 2 has a supply tube 3 for the supply of hydrogen sulfide-containing gases, a supply tube 4 for the supply of ammonia- and hydrogen sulfide-containing gases and a supply tube 5 for the supply of steam. The air required for combustion is supplied through a supply tube 6 to an air register 7 surrounding the burner. Air and all the gases coming from the burner are mixed in a mixing chamber 8 and are combusted in a combustion chamber 9. By means of a separate mixing zone which becomes a combustion zone past a constriction, very good mixing is obtained of the combustion air and the gases to be combusted. A higher degree of mixing is obtained by swirling motions in the combustion zone.

Figure 2:
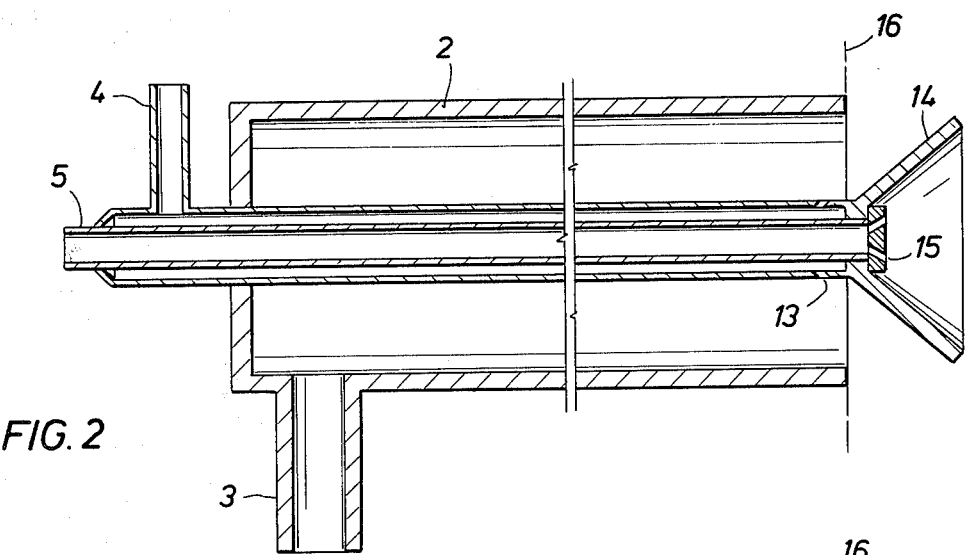
FIG. 2 is a diagrammatic cross section of the burner of FIG. 1.

In FIG. 2 the same reference numerals are used. The burner 2 consists of a double gun comprising a supply tube 3 and a supply tube 4. Supply tube 4 for the ammonia-containing gases can in turn contain an inner tube 5 for the supply of steam. Supply tube 4 has radial emergence openings 13 and is provided with a conical end 14 near the burner nozzle. The supply tube 5, which is concentrically located in the supply tube 4, has emergence openings 15 which are located within said conical end. The plane of emergence of the gases supplied via the double gun is indicated by 16. After emerging, the gases are very thoroughly mixed in the mixing zone 8 with the air flowing along the burner 2. The conical surface 14 ensures that the gases to be combusted are deflected to the air stream, so that mixing takes place before the total, air-enriched gas mixture enters the combustion chamber 9.

In order to prevent condensation taking place in the burner tube 4 with formation of $NH_4HS$, the ammonia- and hydrogen sulfide-containing gases can be maintained at a temperature of at least 85° C. by supplying steam to the burner through the supply tube 5.

The combustion chamber 9 becomes a reaction chamber 10 which provides a certain residence time in order to ensure that the various reactants will react with each other. Construction-wise the reaction chamber may be considered as the extension of the combustion chamber. Both the combustion chamber 9 and the reaction chamber 10 are provided with ceramic lining 12 which is applied on a heat-insulating layer 11.

Figure 3:
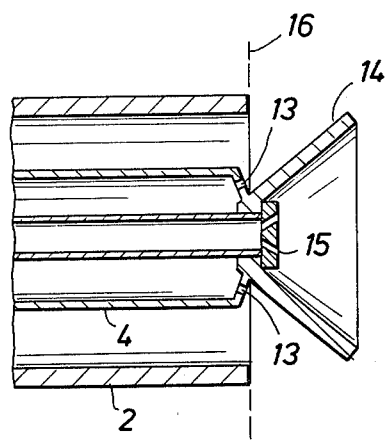
FIG. 3 is a modification of the burner nozzle of the burner shown in FIG. 2.

In FIG. 3 the same reference numerals are used as in FIG. 2. It shows a modification of the burner nozzle with in particular another location of the emergence openings 13 of the supply tube 4 in relation to the conical end 14.

The process of the invention will be further illustrated with reference to the following Illustrative Embodiment.

ILLUSTRATIVE EMBODIMENT

To the burner of the thermal zone of a sulfur recovery unit with a production capacity of 100 tons of sulfur per stream day a hydrogen sulfide-containing gas and an ammonia- and hydrogen sulfide-containing gas are supplied separately. The thermal zone of said unit is of the type shown in FIG. 1 and has a double gun burner with a capacity of 10,688 kg/h of air which is supplied via the air register.

The ratio of the distance between the burner nozzle (plane of emergence) and the constriction between mixing zone and combustion zone to the diameter of said constriction is 0.75, and the ratio of the burner diameter, measured at the outer of the two concentric burner gun tubes, to the diameter of the constriction is 0.72.

The double gun burner has also a central steam supply tube which is located in the inner concentric tube and debouches with emergence openings into the mixing zone.

The hydrogen sulfide-containing gas stream, which contains 90% by volume of $H_2S$, 4% by volume of $CO_2$, 5% by volume of $H_2O$ and 1% by volume of hydrocarbons, is supplied to the outer of the two concentric burner tubes at a flow rate of 2966 $Nm^3/h$. The gas temperature is 45° C. The ammonia-containing gas stream, which contains 29% by volume of $NH_3$, 37% by volume of $H_2S$ and 34% by volume of $H_2O$ and comes from a stripper column of a water purification unit, is supplied to the inner of the two concentric burner tubes at a flow rate of 668 $Nm^3/h$. The gas temperature is 95° C. In order to prevent cooling and condensation of this gas in the burner a small quantity of super-heated steam is supplied to the central steam supply tube. The total acid gas mixture contains 5.33 mol.% of $NH_3$.

What is claimed is:

1. A process for combusting two gas streams, a first stream containing ammonia and hydrogen sulfide gases, and a second stream containing hydrogen sulfide gas and no ammonia, in the thermal zone of a sulfur recovery unit in which hydrogen sulfide-containing gases are partially combusted to a mixture of sulfur dioxide and hydrogen sulfide in a ratio of substantially 1:2 by supplying said hydrogen sulfide-containing gases to a burner consisting of a double gun having two concentric tubes and surrounded by an air register, which burner debouches into a mixing zone followed by a combustion zone, comprising supplying said second stream comprising primarily hydrogen sulfide-containing gases to the mixing zone via the outer of the two concentric tubes and mixing said stream in said mixing zone with an oxygen-rich gas or gas mixture supplied to the mixing zone via the air register, and separately supplying said first stream comprising primarily ammonia-containing gases to the thermal zone via the inner of the two concentric burner gun tubes, said ammonia-containing gases leaving the burner and entering the mixing zone at about the plane of emergence of said hydrogen sulfide-containing gases, and combusting said gases in the combustion zone.

2. The process of claim 1 wherein said ammonia-containing gases have a temperature of at least 85° C.

3. The process of claim 1 or 2 wherein the inner of the two concentric tubes contains a central steam supply tube.

4. The process of claim 3 wherein steam is supplied to the mixing zone to be mixed with the gas mixture formed there.

5. The process of claim 1 wherein the mixture of the first stream comprising primarly ammonia-containing gases and the second stream comprising primarily hydrogen sulfide-containing gases comprises a total acid gas mixture having an ammonia content of at least 3% by volume.

6. The process of claim 5 wherein the total acid gas mixture has an ammonia content of 3-15% by volume.

7. The process of claim 6 wherein the residence time of the total gas mixture in a reaction chamber following the combustion chamber is at least 0.4 sec.

8. The process of claim 7 wherein the residence time is 0.5-1.2 seconds.

* * * * *